United States Patent
Haddad

(10) Patent No.: US 11,450,194 B2
(45) Date of Patent: Sep. 20, 2022

(54) BUILDING MANAGEMENT SYSTEM AND INTERFACE

(71) Applicant: 1VALET CORP., Gatineau (CA)

(72) Inventor: Hanna Haddad, Ottawa (CA)

(73) Assignee: 1VALET CORP., Gatineau (CA)

( * ) Notice: Subject to any disclaimer, the term of this patent is extended or adjusted under 35 U.S.C. 154(b) by 0 days.

(21) Appl. No.: 17/216,837

(22) Filed: Mar. 30, 2021

(65) Prior Publication Data
US 2021/0304583 A1 Sep. 30, 2021

Related U.S. Application Data

(60) Provisional application No. 63/002,559, filed on Mar. 31, 2020.

(51) Int. Cl.
*G08B 21/18* (2006.01)
*G01D 7/00* (2006.01)
*G06F 16/248* (2019.01)

(52) U.S. Cl.
CPC .......... *G08B 21/182* (2013.01); *G01D 7/00* (2013.01); *G06F 16/248* (2019.01)

(58) Field of Classification Search
CPC ...... G08B 21/182; G01D 7/00; G06F 16/248; F24H 9/2007; F24H 1/08; G01M 3/2876; G06K 9/6267
See application file for complete search history.

(56) References Cited

U.S. PATENT DOCUMENTS

| | | | |
|---|---|---|---|
| 10,533,770 B1* | 1/2020 | O'Keeffe | F24H 9/2007 |
| 2013/0245838 A1* | 9/2013 | Zywicki | G05D 23/1905 700/278 |
| 2013/0268128 A1* | 10/2013 | Casilli | G05D 23/19 700/276 |
| 2017/0051935 A1* | 2/2017 | Lee | G05B 19/048 |
| 2017/0191695 A1* | 7/2017 | Bruhn | H04N 21/4131 |
| 2018/0163984 A1* | 6/2018 | Alberth, Jr. | F24F 11/62 |
| 2018/0266718 A1* | 9/2018 | Gillette | F24F 11/64 |
| 2018/0299845 A1* | 10/2018 | Ray | G05B 13/0265 |
| 2020/0116381 A1* | 4/2020 | Heintzelman | F24F 11/65 |
| 2020/0233440 A1* | 7/2020 | Gillette | F24F 11/76 |
| 2020/0309398 A1* | 10/2020 | Uerkvitz | F24F 11/52 |
| 2020/0325660 A1* | 10/2020 | Bailey | G08B 21/182 |
| 2021/0304583 A1* | 9/2021 | Haddad | G06F 16/248 |

* cited by examiner

*Primary Examiner* — An T Nguyen

(57) ABSTRACT

A method is presented for monitoring the use of a building area, where instruments are installed at a variety of points in a building to monitor and record parameters of interest to a building operator. The building operating system provides past and real-time information based on the parameters, and alerts a building operator when unintended events occur. The circumstances for unintended events are bundled into modes, such that by selecting a mode for a building area, a building operator is effectively selecting a set of circumstances for which alerts must be given.

6 Claims, 8 Drawing Sheets

Building Operating System Interface Options

Typical Data for a Building Operating System Interface

| Occupant | Apartment | Lobby | Mail | Parking |
|---|---|---|---|---|
| Alex | 101 | 5 min / day | No | NA |
| Alexa | 101 | 5 min / day | No | Subscriber |
| Bob | 102 | 5 min / day | No | Subscriber |
| Alice | 103 | 4 min / day | No | Subscriber |
| John | 103 | 4 min / day | Yes | Subscriber |
| Jane | 104 | 5 min / day | Yes | NA |
| Mary | 105 | 5 min / day | No | NA |
| Joe | 105 | 4 min / day | No | Subscriber |
| Janet | 106 | 5 min / day | No | Subscriber |
| Jeff | 106 | 5 min / day | No | NA |
| Courrier Jack | 010 | 5 min / day | NA | NA |
| Cleaner Harry | 020 | 45 min / day | NA | Subscriber |

Figure 2

BUILDING MANAGEMENT SYSTEM AND INTERFACE

FIELD OF THE INVENTION

This invention pertains generally to building management systems, and in particular to a building monitoring system that can display to a building operator a collection of real-time and past data, representing the status of different areas of a building at a different points in time, alert the operator of unintended events in the building, and allow the operator to easily select a mode for an area of the building, corresponding to its intended use.

BACKGROUND OF THE INVENTION

Multi-unit commercial and residential buildings can be used for a variety of purposes, and for each purpose, the conditions considered as normal can be different. For example, one area of a building can be used for office spaces, while another area can be used for residential units such as apartments, and the acceptable temperature range for each area, each unit, or even each room, can differ.

Defining the normal conditions for a building area can be useful for identifying anomalies in the building's usage. For example, a temperature that is too warm may indicate a system malfunction or unnecessary energy consumption, and a water level that is too high may indicate flooding or plumbing damage.

While building monitoring systems are available, they are generally limited in scope, and suited for a building for which the use is similar over an extended period of time.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

Following the recent popularity of short-term rental services such as Airbnb, the need arises for a method to allow a building operator to be alerted of changing building parameters and conditions, and to easily change the set of conditions associated with an area of a building. A residential unit for example can be monitored accordingly with the intended use of that unit, and the monitoring can allow a building operator to be notified of events resulting from intentional or non-intentional misuse of the unit, including when its regular occupant is absent.

The present invention relates to a building monitoring system that allows a building operator to view real-time and historical status parameters related to different areas of a building, to be notified of an anomaly when real-time parameters are outside normal conditions, and to easily change the set of conditions, or mode, associated to a building area, such that the conditions for an anomaly and notification can be different for each mode.

In the present invention, when an operator is selecting the mode for a building area, the operator is essentially selecting a predefined set of conditions beyond which notifications are to be given. For example, an apartment mode identified as "normal" might be different from a mode called "vacant" in that the acceptable range of temperature in each case is different. In the present invention however, a mode can include ranges and conditions for many distinct sets of parameters, such that selecting a mode is essentially selecting a set of conditions where notifications must be given to a building operator. Beside a temperature range, other conditions could be a water level threshold, a maximum number of people inside a building area, and a noise level. The conditions for each of these four parameters, in the case of an apartment unit, could be different for a mode called "normal" and a mode called "Airbnb".

With a system that can alert a building operator to a variety of events occurring in areas of a building under different modes, a building operator can be provided with real-time data, past data, processed data, and notifications as to when any of the monitored parameter is beyond a set range, and a building operator can make better decisions regarding the efficient and secure operation of the building. By adding the ability for the operator to change the mode, or group of notification conditions associated with an area, the notifications can remain relevant as the operator changes the use of a building area.

BRIEF DESCRIPTION OF THE DRAWINGS

FIG. 2 illustrates a computer interface showing a table containing building data displayed to a building operator.

DETAILED DESCRIPTION OF THE INVENTION

Figure 1:
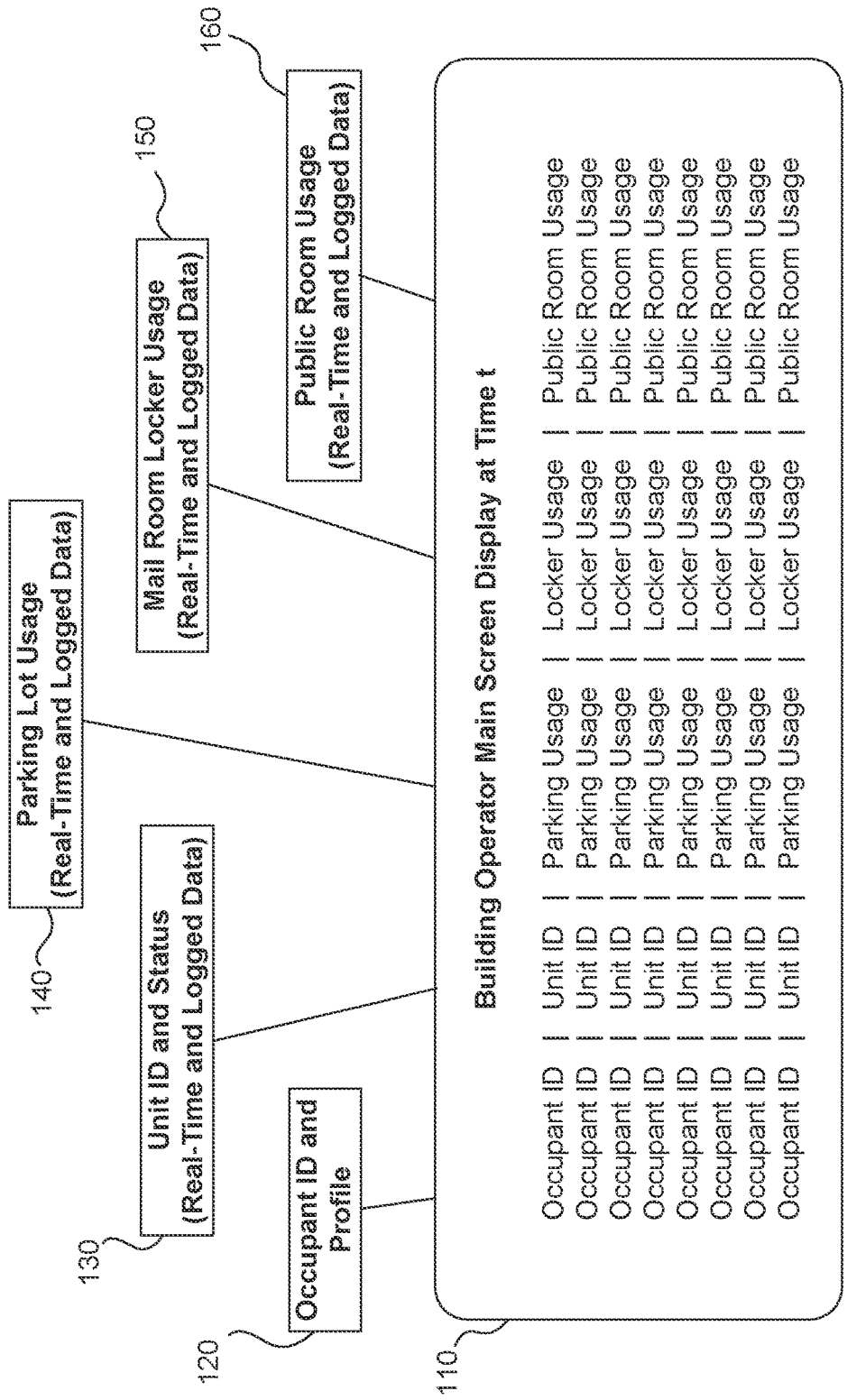
FIG. 1 illustrates a computer interface displaying information made available to a building manager or operator.

In order to ensure the efficient operation of a building, a building operator must be promptly informed of anomalies that can occur within. Since human witnesses cannot be expected to constantly observe the building parameters that may matter, monitoring instruments can be installed at key locations instead, and the data can either be viewed in real-time by a building operator or stored in a database from where it can accessed later. The data can also be further processed along with past data or concurrent data from other instruments, so as to provide sophisticated results to the building operator than can facilitate an operator's decisions. For a multi-unit building, the data can represent physical conditions as measured in the plurality of areas in a building, including hallways, units, rooms, a parking lot, a mail room, and areas specific to the building.

In an embodiment of the present invention, a building is fitted with a plurality of instruments to monitor the status of building areas, ranges, thresholds and other numerical conditions can be set for each monitored parameter and a building operator can be notified when measurements fall beyond some accepted norms. For example, in an embodiment where the building is an apartment building and a unit is an apartment, there might be three instruments: a thermometer, a water level indicator, and a noise level indicator; and for a tenant of the unit, a pre-set temperature range may be from 16 to 26° C., a water level threshold might be 10 mm, and a normal noise level range might be 10 dB to 90 dB.

However, the ranges, thresholds and other conditions can be different for different units or areas of a building, and they can also be different for different times of the day, week or year. To improve accuracy of a building operator's monitoring, embodiments of the present invention allow a building operator to change the ranges, thresholds and conditions of an area of the building by simply selecting a mode in accordance with the intended use of a building area.

In embodiments of the present invention, a building operator is provided with a "Building Operating System" comprising at least one database, at least one processor, at least one display interface, and software programmed to store, display and process data representing the status of a building, as measured by instruments. Since the available data for a large, highly-monitored building can be significantly more than what can conveniently be displayed on a typical display interface, the software can allow an operator to alternatively select what data is to be displayed and offers numerous options as to data presentation.

In embodiments of the present invention, each event occurring in a building is of concern to at least one occupant, but not necessarily to all occupants. Therefore, each monitored parameter is associated with at least one occupant. In order to have the occupant's information in the database, a building operator can request and collect information from each new occupant as they become involved with the building, and a set of data related to a unique occupant is referred to herein as an occupant's "profile".

In embodiments of the present invention, a building can be any of: a residential apartment building, a condominium building, a commercial building, a retirement home, a hotel, a hospital, government-operated building, and a multi-unit building.

In embodiments of the present invention, an occupant can be any of: a tenant, a condominium owner, a guest, a patient, an employee, a service provider, a visitor, a domesticated animal, an intruder, and a person.

In embodiments of the present invention, a parameter can be any of: a physical condition that can be measured, a result that can be calculated from measurements, a true or false value representing whether or not a certain event has occurred, any of the information in a building occupant's profile, and a status that may be useful to a building operator.

In an embodiment of the present invention, the building can be an apartment building, and most of the occupants can be tenants. Each apartment can be fitted with at least one instrument that can provide data representing the state of an apartment's parameter, to a database which is accessible by a building operator.

In an embodiment of the present invention, a parking lot associated with the building can also be fitted with instruments that can provide data to a database.

In an embodiment of the present invention, a mail delivery room where mail lockers are installed can also be fitted with instruments that can provide data to a database, and so can a public room of the building, which can be a lobby.

FIG. 1 illustrates an embodiment of the present invention where a computer interface [110] displays to a building operator five columns of data related to occupants and various parts of a building. Each row in the display is associated with an occupant, whose identification (ID) [120] can be displayed in a first column on the screen. Data specifying the ID of an apartment unit [130] associated with an occupant can be displayed on a second column of the screen. Data indicating the occupant's parking lot usage [140] can be displayed on a third column. Data indicating an occupant's use of a mail room locker usage [150] can be displayed in a fourth column, and data indicating an occupant's use of a lobby or other public room [160] can be displayed in a fifth column. Embodiments may provide additional columns related to additional building areas, and a building operator using the interface can select which columns to display.

In an embodiment of the present invention, a building is associated with 12 registered occupants including ten tenants, six rental units, one mail room, one lobby, one mail room, and one parking lot.

FIG. 2 illustrates an embodiment of the present invention where an apartment building is associated with 12 occupants [210] including ten tenants, a mail person and a cleaning person. The building space associated with an occupant, such as an apartment or room number, is identified in the second columns [220]. The third column contains a parameter indicating an occupant's use of the lobby, which can be the daily duration of an occupant's presence in the lobby [230]. The fourth column displays whether or not there is a package in an occupant's mail locker [240], and the fifth column indicates whether or not an occupant is a subscriber to the use of a parking lot [250] associated with the building.

In embodiments of the present invention, a new occupant can provide personal information to a building operator. Once entered in a database, the data can be accessed by a building operator and be displayed on the screen.

Figure 3:
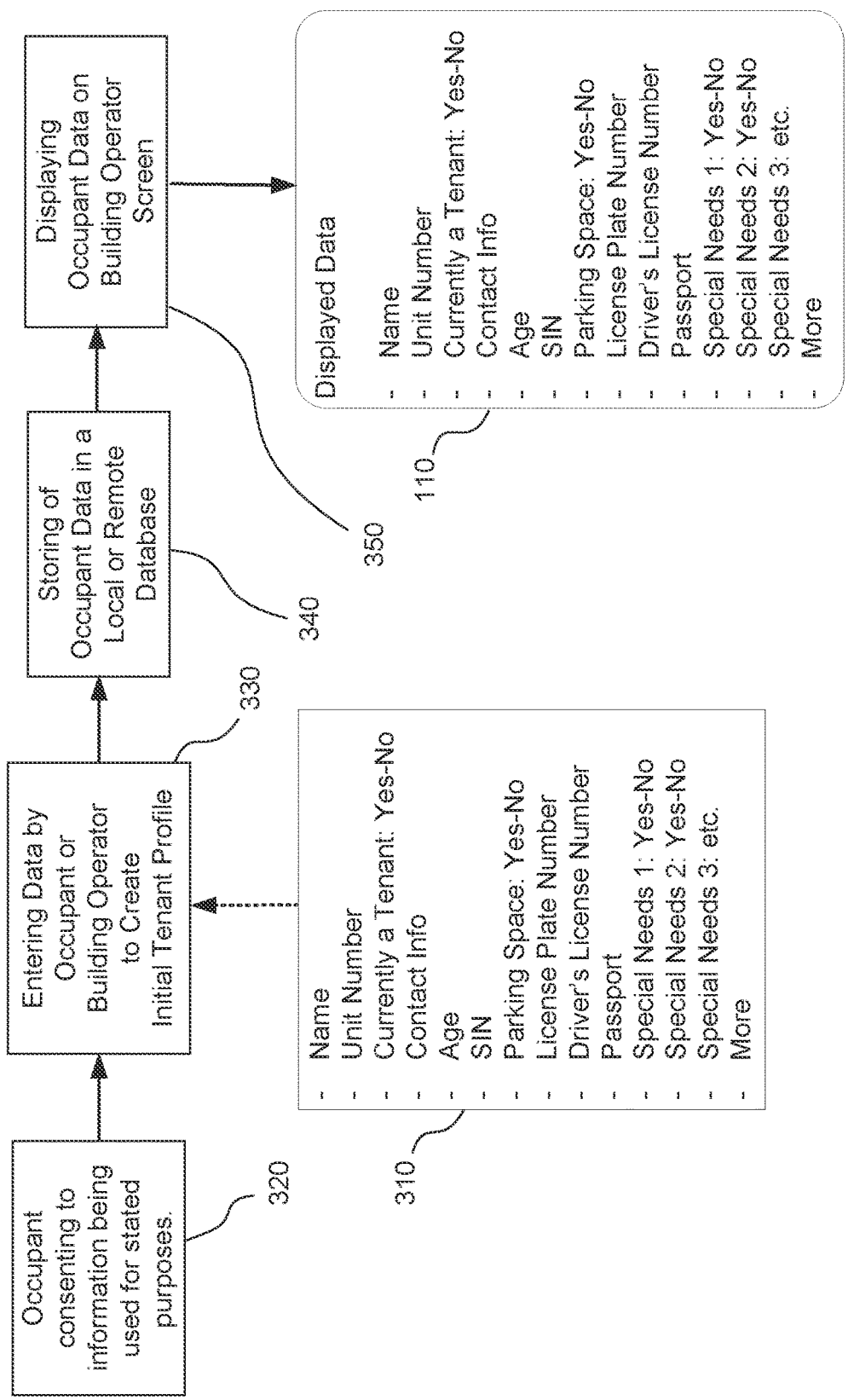
FIG. 3 illustrates a flowchart where an occupant's profile data is entered, stored, processed and displayed.

FIG. 3 illustrates an embodiment of the present information in which an occupant provides initial profile information [310] to a building operator. The occupant can provide consent for the information to be used for stated purposes [320]. The information can be entered into the system by the building operator [330] and stored on a local or remote database [340]. Upon computer commands by a building operator, an occupant's profile data can be displayed [350] onto the operator's interface in table form and replace other displayed information so as to display the information in a convenient manner [110].

In embodiments of the present invention, instruments can be installed in an area of a building, and measured parameters can be displayed on a building operator's screen when certain measurements are performed. The measurements can also be stored in a database from where they can be processed for automated analysis.

In an embodiment of the present invention, an area of a building can be an apartment unit, and a plurality of instruments can be installed in that apartment, including a water level detector and an electronic thermometer. When the water level monitored by the water level detector reaches a pre-set threshold, the water level detector is activated and sends a signal, along with a time stamp, to a database accessible by a building operator. From the database, the water level information can be displayed on the building operator's interface as an alert, and be obtained in real-time. Further, when the electronic thermometer makes a measurement, the measurement is associated with a time stamp and sent to a database, from where it can be displayed onto the building operator's display in real-time as well. Therefore, a building operator can be informed of the status of an apartment regarding its water level status and its temperature.

In embodiments of the present invention, the measured data can not only be viewed in real-time, but also after it has been stored in a database for a certain time.

In an embodiment of the present invention, a range of acceptable temperatures is defined and pre-set as between 16° C. and 26° C., and the temperature of an area is monitored over the course of many months. If a new temperature measurement is beyond the range, the data processing can result in notifying the building operator, and the building operator can select to view the data on an interface.

In embodiments of the present invention, recent data can be compared with stored data and algorithms can identify anomalies. For example, if temperature measurements show a drop that is abnormally quick, an algorithm can identify the situation as an anomaly and alert the building operator.

Figure 4:
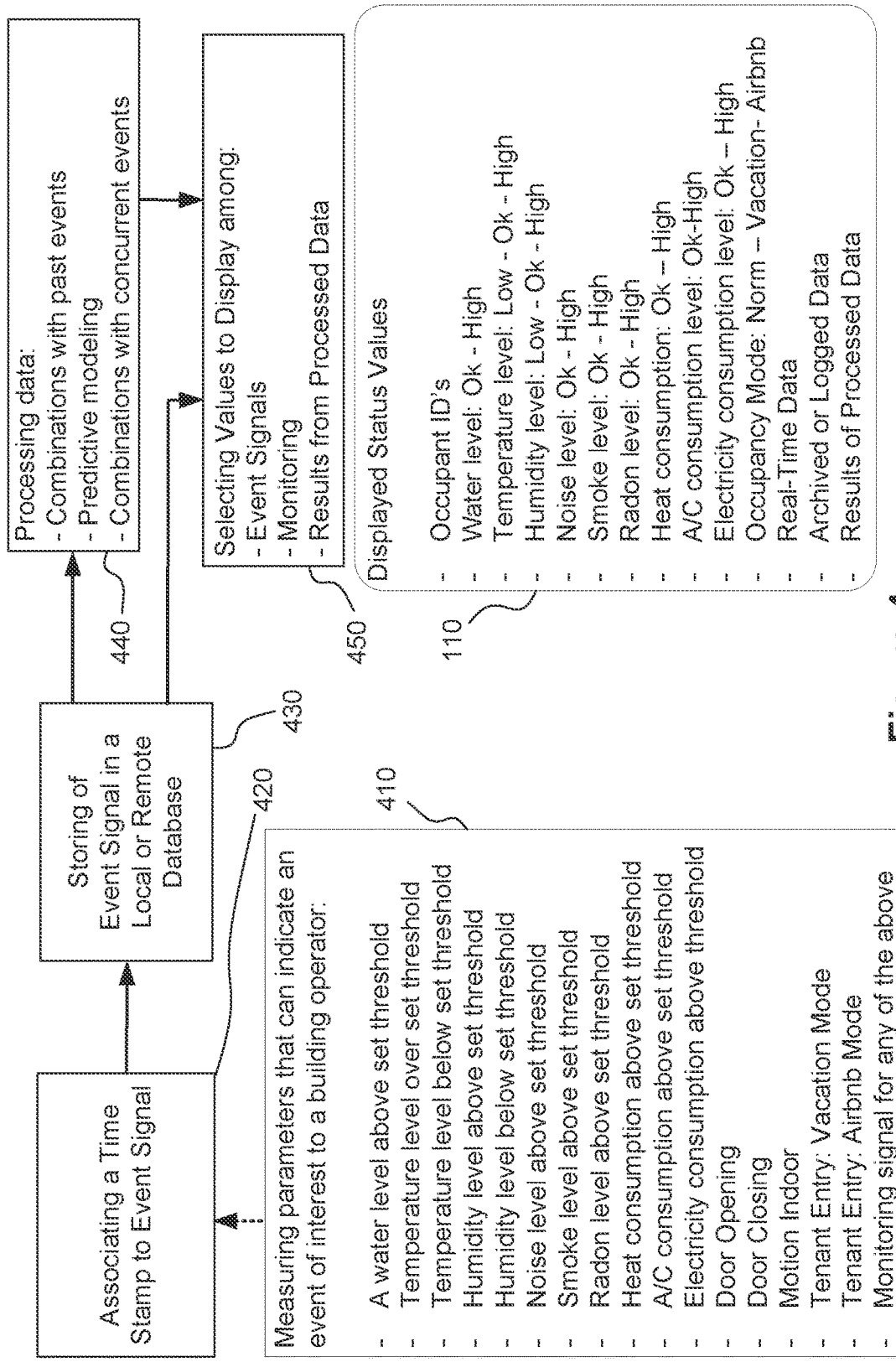
FIG. 4 illustrates a flowchart where data from instruments installed in a private unit is entered, stored, processed and displayed.

FIG. 4 illustrates an embodiment of the present invention where a water level indicator, an electronic thermometer, and a plurality of instruments have been installed in an apartment unit of a building. The instruments [410] each have the ability to send a signal that can be associated with a time stamp [420] and stored in a database [430]. From the database, a measurement can be processed with past measurements in order to alert the operator of any anomalies. An operator can also simply view the historical measurements. The data can also be processed with data from another instrument, obtained during the same time period, and allow a building operator to get a broader picture of monitoring and anomalies occurring during a same time period [440]. A building can also select [450] to view instruments measurements directly, in real-time. The building operator's selections can be displayed on an interface [110].

In an embodiment of the present invention, an algorithm can combine measurements from different instruments, occurring in the same time interval, and draw a conclusion that can be provided to a building operator. An example of combining different measurements from a same time interval is where a water level alarm occurs in the same time period as an unusually low temperature measurement. An algorithm processing these two events can conclude that a low temperature caused a pipe to burst and water to spill out, increasing the water level in an apartment unit, and propose that scenario to a building operator. The building operator can also select to view any measurements taken by other installed instruments, having occurred during the same time interval.

In an embodiment of the invention, the building operator can select to view data as measured by any instrument in real-time.

In an embodiment of the present invention, a plurality of measuring instruments can be installed in the lobby of a multi-unit building.

Figure 5:
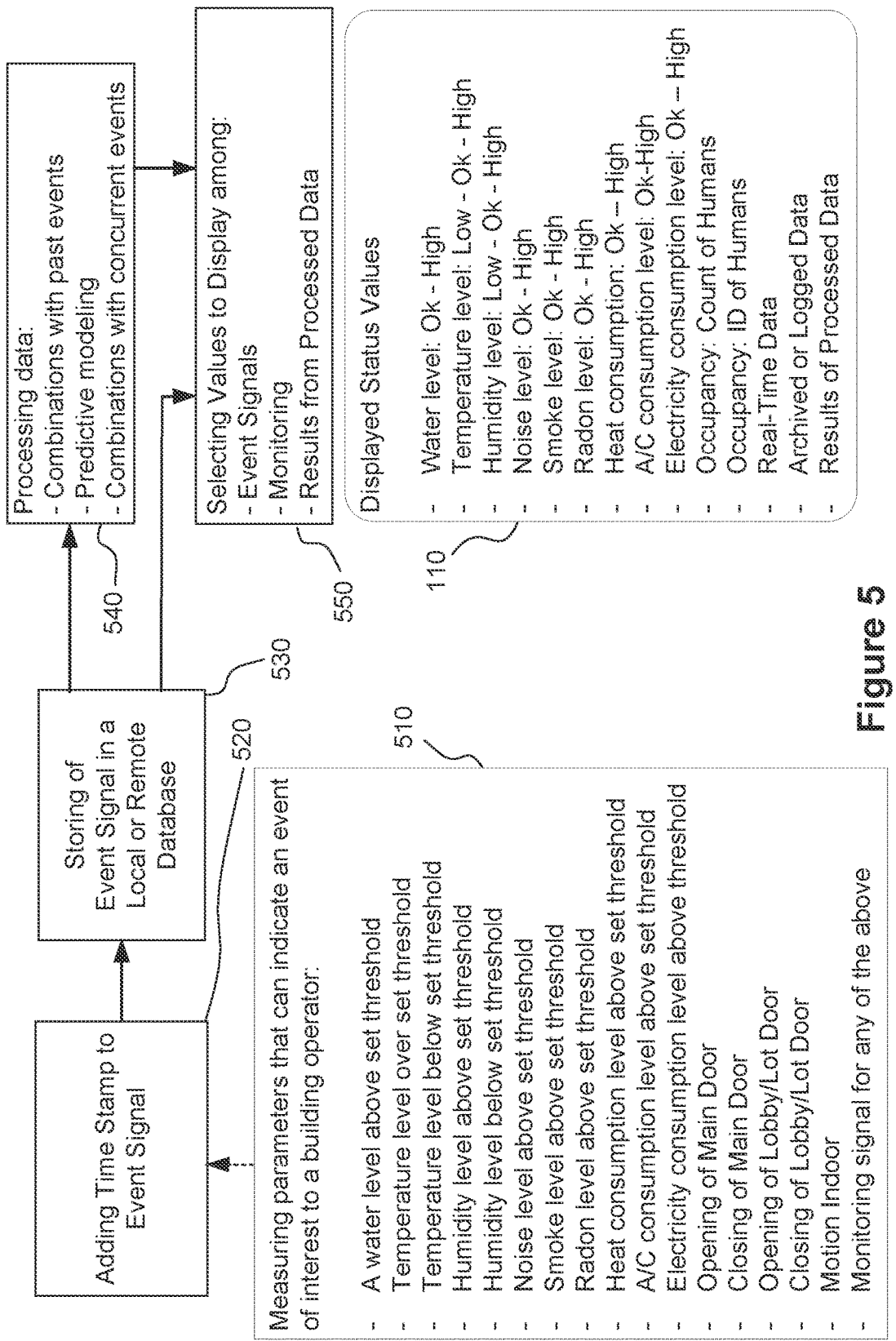
FIG. 5 illustrates a flowchart where data from instruments installed in a public room is entered, stored, processed and displayed.

FIG. 5 illustrates an embodiment of the present invention where events of interest to a building operator are identified by measuring certain parameters describing the status of a room that is accessible to any building occupant [510]. An example of such a room is the building's lobby and an example of an event of interest is the temperature therein being below 16° C. When a temperature measurement in the lobby is below 16° C., a time stamp can be added to the temperature measurement [520] and the event can be stored in a local or remote database [530]. A measurement can be processed [540] along with past temperature measurements or with concurrent measurements from other instruments to deduce certain results. An example of processing with past events is to compare a recent temperature measurement with previous ones and determine if the temperature in the lobby is falling or rising. An example of processing concurrent events is to determine that if a temperature is below 16° C., and the lobby door is opened, then the door being open may be the cause of the low temperature, and such a proposition can be made available to the building operator. Among the available measurements and processed measurements, a building operator can select [550] which ones to display on the Building Operator Screen [110].

In an embodiment of the present invention, the building is an apartment building, an apartment of the building has at least one tenant, and each tenant can be subscriber to using a parking lot of the building. An interface for the building operating system [110] can show in a column whether or not an occupant is a subscriber [250]. By selecting the column cell corresponding to an occupant, a building operator can view if the occupant's vehicle is currently occupying the space, and also the history of the space's use, including the times of entry and departures of the vehicle as it crossed the parking lot's gate.

Figure 6:
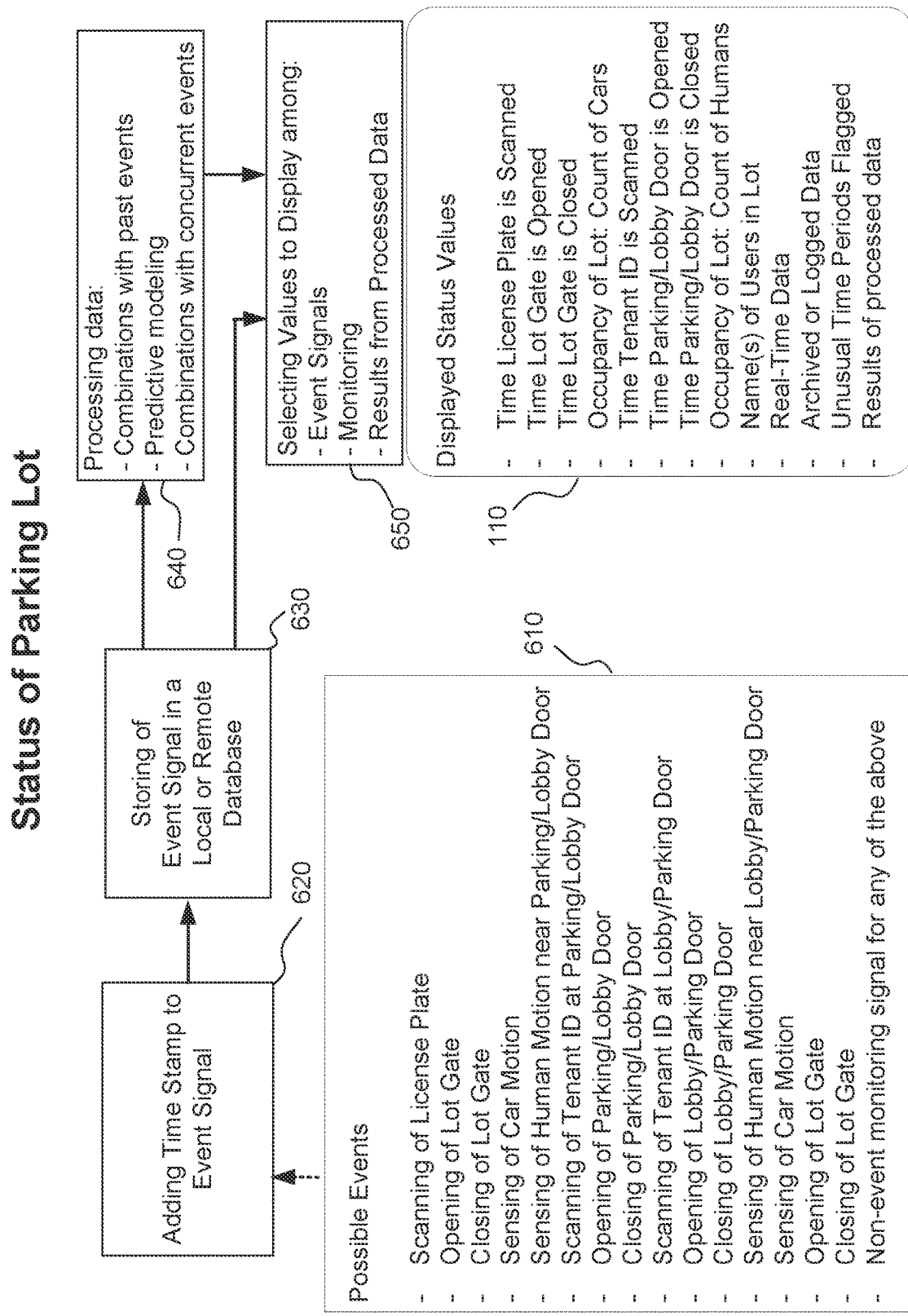
FIG. 6 illustrates a flowchart where data from instruments installed in a parking lot is entered, stored, processed and displayed.

FIG. 6 illustrates an embodiment of the present invention where events of interest to a building operator are identified by measuring certain parameters describing the status of a parking lot [610]. Once a measurement is taken, a time stamp is added to it [620], and the data is stored on a local or remote database [630]. The data can then be processed along with past or concurrent information [640], and both direct and processed information can be made available to a building operator through the building operating system's interface [650]. An example of a measurement being processed with similar past measurements is a parking space that is not being used anymore. This could indicate that the space could be offered to someone else instead, thereby optimizing use of building area. An example of measurements being processed concurrently is comparing how often each vehicle crosses the parking lot's entry-exit gate, ranking the vehicles according to number of gate crossings, and recommending to the building operator that the most frequently driven vehicles be parked closer to the gate.

In embodiments of the present invention, an area of the building can be used for lockers to receive mail and packages. A building occupant, who can be a tenant, can subscribe to the use of a mail locker, and a building operator can view on the building operating system's interface [110] whether or not a mail locker is occupied. The building operator can further notify a tenant that a mail locker contains a package.

Figure 7:
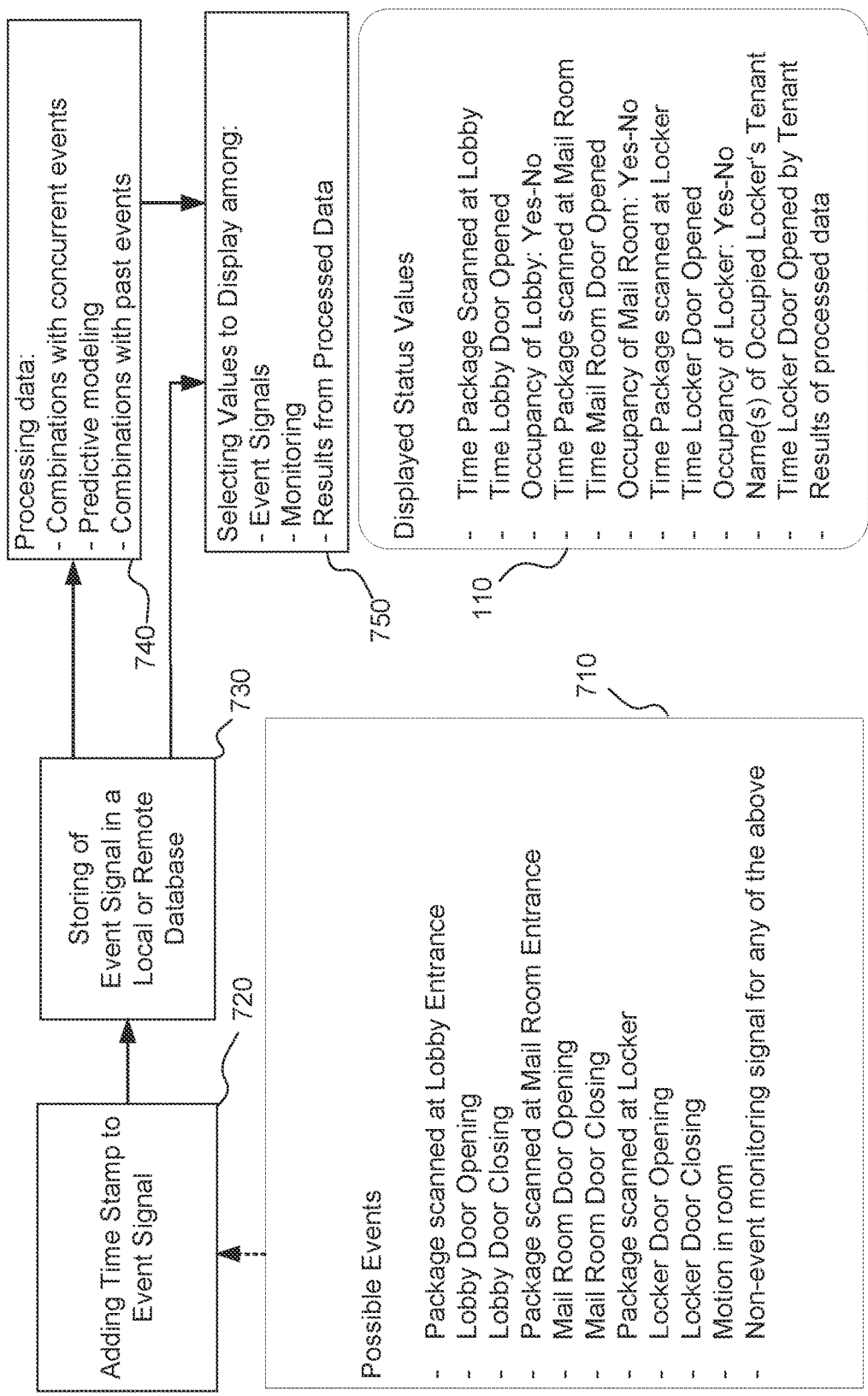
FIG. 7 illustrates a flowchart where data from instruments installed in a mail room is entered, stored, processed and displayed.

FIG. 7 illustrates an embodiment of the present invention where events of interest to a building operator are identified by measuring certain parameters describing the status of a mail room [710]. Once an event occurs, such as a package scan, a locker door opening, or motion in the mail room, the information is associated [720] with a time stamp [720] and stored in a local or remote database [730]. The data can then be processed with concurrent or past events [740] in order to establish patterns and identify abnormal events. An example of comparing current with past information is the opening of a locker door, with no corresponding closing after a reasonable delay. This might signify that a package in the locker is at risk of being stolen. An example of comparing concurrent events is having many locker doors opened at the same time. This might raise a flag that the risk of the courier making an error in the deliveries is increased. Direct and processed information can be made available to the building operator [750], and the selected values can be displayed on the building operator system's interface [110].

In embodiments of the present invention, a building operator can select a mode for a building unit, where each mode represents a set of ranges, thresholds and conditions corresponding to an acceptable state for the building unit, as measured by instruments. Selection of a mode can correspond to adjusting the conditions for alerting the building operator of an anomaly, as well as selecting how measured data will be processed.

In an embodiment of the invention, the building is an apartment complex, and the building operator has the option to select via software, the mode of each apartment, which can be one of five options: Normal, Vacation, Airbnb, Service, and Vacant.

Figure 8:
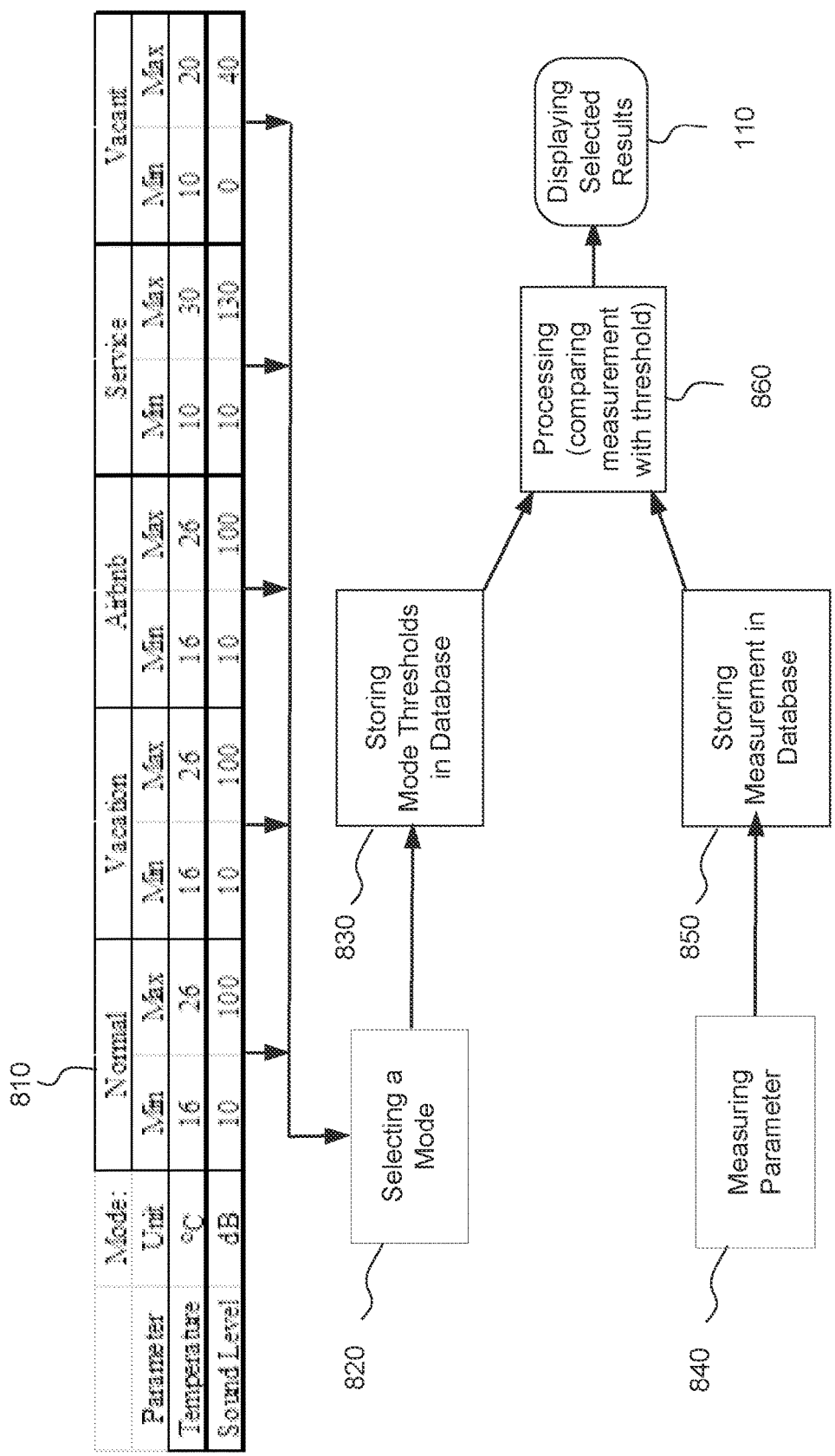
FIG. 8 illustrates a flowchart showing two modes of a building unit and how a mode can be used.

FIG. 8 illustrates an embodiment where a building operator can select for an apartment one of five modes, each of which is associated with two parameters: the temperature and sound level, and each parameter has a minimum and a maximum threshold. The thresholds for each parameter can be different for each mode [810]. Once a building operator has selected a mode for the apartment [820], the minimum and maximum values for the related parameters are stored in a database [830]. When a measurement is performed [840], it is also stored [850] in the database and a processor compares it with the thresholds of the selected mode [860]. The building operator can then select which results to display on the building operating system's interface.

I claim:

1. A method to monitor a building for a burst water pipe, the method comprising:

measuring in the building at least two parameters of interest, wherein a first parameter is temperature and a second parameter is water level or humidity;

recording in real-time in a database data for each parameter along with time stamps, comparing the data for each parameter with a parameter threshold, displaying real-time data on a user interface, displaying an alert signal for a potential burst pipe on the user interface when a threshold for the first parameter and the second parameter is met concurrently;

where the threshold for the first parameter is a rapid change in temperature and the threshold for the second parameter is a decrease in water level or an increase in humidity.

2. The method of claim 1 wherein a building is conceptually divided into a plurality of distinguishable areas associated with a building and wherein each building area is monitored by a variety of instruments transmitting data to a database.

3. The method of claim 1 wherein the data is recorded in a database with time stamps.

4. The method of claim 1 wherein data stored in the database can be observed in real-time by a building operator, whether or not a condition is breached.

5. The method of claim 1 wherein data stored in the database can be observed by a building operator at any time after the data was recorded.

6. The method in claim 1 wherein a building operator can alternatively select what data is to be displayed on the user interface.

* * * * *